United States Patent
Min et al.

(10) Patent No.: US 7,203,515 B2
(45) Date of Patent: *Apr. 10, 2007

(54) WIRELESS LOCAL LOOP SYSTEM FOR INTERFACING WITH ANALOG COMMUNICATION DEVICE

(75) Inventors: Seung Ki Min, Kyonggi-do (KR); Sung Chul Yang, Kwangmyong-shi (KR)

(73) Assignee: LG Electronics Inc., Seoul (KR)

( * ) Notice: Subject to any disclaimer, the term of this patent is extended or adjusted under 35 U.S.C. 154(b) by 476 days.

This patent is subject to a terminal disclaimer.

(21) Appl. No.: 10/137,564

(22) Filed: May 2, 2002

(65) Prior Publication Data

US 2003/0119499 A1 Jun. 26, 2003

(30) Foreign Application Priority Data

Dec. 21, 2001 (KR) ................................ 2001-82737

(51) Int. Cl.
H04M 1/00 (2006.01)
(52) U.S. Cl. ............................... 455/554.2; 455/554.1; 455/426.1; 455/426.2; 379/399.01
(58) Field of Classification Search ................ 455/422, 455/426, 515, 554, 557, 3.06, 561, 422.1, 455/424, 425, 426.1, 426.2, 554.1, 554.2; 379/399.01, 398, 399.02, 93.01; 375/220, 375/222, 22, 219
See application file for complete search history.

(56) References Cited

U.S. PATENT DOCUMENTS 5,848,138 A * 12/1998 Sarpola et al. ......... 379/114.01
5,983,117 A * 11/1999 Sandler et al. .............. 455/557
6,393,280 B1 * 5/2002 Lee et al. ................. 455/426.2
6,668,176 B1 * 12/2003 Koski et al. ........... 379/399.01
6,788,953 B1 * 9/2004 Cheah et al. ............. 455/550.1
6,844,939 B1 * 1/2005 Kim et al. ................. 358/1.15
2001/0041539 A1 * 11/2001 Juntunen et al. ........... 455/67.7
2003/0045229 A1 * 3/2003 Snelgrove et al. ......... 455/3.05

FOREIGN PATENT DOCUMENTS

JP 1002553000000 2/2000

* cited by examiner

Primary Examiner—Duc M. Nguyen
Assistant Examiner—Anthony S. Addy
(74) Attorney, Agent, or Firm—Lee, Hong, Degerman, Kang & Schmadeka

(57) ABSTRACT

A wireless local loop (WLL) system capable of interfacing with an analog communication device is provided. The WLL system comprises: a SLIC (SLT interface Circuit) capable of matching analog data line characteristics of an analog communication device; and a MODEM for at least (1) receiving an analog data signal provided by the analog communication device through the SLIC, and converting the analog data signal into a class '0' digital data, or (2) receiving a class '0' digital data provided by an MSM, converting the class '0' digital data into an analog data signal, and providing the analog data signal to the analog communication device through the SLIC.

17 Claims, 3 Drawing Sheets

WIRELESS LOCAL LOOP SYSTEM FOR INTERFACING WITH ANALOG COMMUNICATION DEVICE

CROSS REFERENCE TO RELATED APPLICATION

This application claims the benefit of earlier filing date and right of priority to the Korean Application No. P2001-82737, filed on Dec. 21, 2001, the content of which is hereby incorporated by reference herein in its entirety.

BACKGROUND

1. Field of the Invention

The present invention relates to a wireless local loop system, and more particularly, to a wireless local loop system capable of interfacing with analog communication devices, such as a credit card referencing device, a smart pay-phone, a security system, a wireless inspection device, and the like.

2. Related Art

In general, a wireless local loop (WLL) system provides a wireless subscriber line that in a wireless manner connects a local switching center to a subscriber's premises (e.g., home or office), by way of radio waves, to provide voice, facsimile, and data communication services.

The WLL is also known as RITL (Radio In the Loop), FRA (Fixed Radio Access), FWA (Fixed Wireless Access), or FCS (Fixed Cellular System) in some countries. Many communication service providers have been recently drawn to the WLL system due to certain advantages that it provides over the currently used wired communication systems. The WLL system was designed by AT&T Bell Laboratory in the early 1970s for use in sparsely populated regions, such as fishing or rural villages, as an alternative to the current communication systems that require the installation of physical wire lines and cables. The intent was to save the cost associated with such installation throughout the sparsely populated areas by providing a wireless communication alternative.

Unfortunately, the WLL system was not a practical solution, at that time, due to difficulties associated with securing the right to use radio frequencies and also the high cost of manufacturing and installing antennas and radio transmitters and receivers. Semiconductor and electronic communication technologies, however, have developed rapidly since the 1990s. As a result of these developments, the efficiency and quality of wireless communication systems have improved. Today, manufacturers can produce more affordable wireless communication devices and equipment. At the same time, due to an increase in the number of subscribers and the reduction in the cost of production of radio equipment, total installation costs per subscriber is less expensive than ever. As such, the WLL system has started to draw the attention of many communication providers.

The WLL system can provide the following advantages over the current wired communication network systems. First, establishment of a wireless subscriber line and service is easier and faster than installation of a physical subscriber line that requires physically connecting a local switchboard to a subscriber's premises via a physical wire or cable. Second, the WLL system is a more durable and reliable system. For example, the WLL system can be used in case of emergency, if the current subscriber line networks are damaged due to a natural disaster, or the like. Third, the WLL system is technologically flexible to accommodate a variety of service requirements, such as POTS (Plain Old Telephone Service), data service, ISDN, and the like. Fourth, costs associated with installation of a WLL system is fixed, less dependent on distance and requires a relatively small initial investment. A quick and substantial return on the initial investment is, however, possible once the system starts to operate. Fifth, a WLL system network can be expanded quickly to accommodate an increase in subscriber communication bandwidth or subscriber base.

Because of the foregoing features, telephone and communication service providers, particularly those in developing countries that still utilizes POTS, consider the WLL system as one of the most effective methods for the quick construction of a subscriber communication network. Although the WLL system is similar to a mobile communication network in that both systems use radio channels as communication media, the advantage of WLL system is that it provides an electronic wave environment that is better than that of a mobile communication network because a WLL system does not require providing service to a mobile unit. Other advantages and features of the WLL system over a mobile communication network are discussed below.

A mobile communication network has a "non-line-of-sight" wave propagation environment. That is, the receiving and transmitting antennas in a mobile communication network are frequently located at a place lower than the surrounding buildings. As a result, generally, a straight carrier wave after transmission is blocked, reflected, and refracted in its straight path before it reaches a receiver in the mobile communication environment. Due to these obstructions, an average wave path loss in a range of 40 dB/decade can occur in a mobile communication network.

A WLL system environment, however, has a wave path loss as low as 20 dB/decade, because it provides a "line-of-sight" propagation environment, wherein the receiving and transmitting antennas are located at rooftop levels and unobstructed by buildings and other natural or manmade obstacles. Further, since the mobility of antennas in the WLL system is limited (i.e., all the stations are stationary), the same power can used to serve a larger area.

The electronic wave environment of the WLL system is implement over a point-to-point communication network structure, where each point is a stationary base stations. Said environment is less susceptible to distortion and weak signal strength in comparison to the electronic wave environment of a mobile communication network that includes a point-to-mobile network structure, wherein the electronic waves may have to propagate in multiple paths before they reach the intended destination.

In a mobile communication network, much overhead is associated with managing signals and tracking a mobile station in anticipation of a hand-off procedure. A hand-off procedure ensures the continuity of service throughout the mobile communication network by establishing a new line of communication between a mobile station and a new base station when the mobile station moves out of the territory of an old base station and into the territory of the new base station. Since the WLL system does not support mobile stations, the WLL system does not require reserving radio channels that are necessary to handle the overhead associated with the hand-off procedure. Thus, all radio channels may be used to route general calls, thereby improving communication bandwidth and efficiency.

Further, in the WLL system, a direct radio link between a building and a base station can be established for reducing interference to a particular subscriber. Because there is no change in the radio link unless the number of subscribers substantially increases or the area covered by the base station (i.e., a cell) is divided, the design of the WLL is substantially simpler than a mobile communication network.

Moreover, the stationary radio communication of the WLL system permits the use of directional antennas on forward/reverse links for reducing identical channel interference to respective subscribers, and in turn allows for shortening the distance in which the same frequency can be reused. The reduction of frequency reuse distance results in an increase in subscriber capacity per unit area.

Typically, the WLL system includes a telephone set, an NIU (a Network Interface Unit), a base station, a base station controller, and a base station managing device. The NIU makes wireless communication between the telephone set and a local switching center possible and is the end point in the WLL system that performs functions such as transmission/reception of a radio signal, modulation/demodulation of a radio channel, voice compression/restoration, and providing access to a PSTN terminal.

Depending on the applied technology, various forms of terminals with built-in or separate RF functions may be available. The terminals may also be in the form of a handset or its equivalents and may support single or multiple communication lines.

The base station is located between the NIU and the base station controller in the communication path. The base station connects to the NIU by radio and to the base station controller by wire. The base station performs the following functions: transmission/reception of radio signals, power control, modulation/demodulation of channels, and protocol transform for signal transmission/reception between the NIU and the base station controller. The base station includes an antenna transmitter/receiver, a power amplifier, channel cards and hardware for interface with the base station controller.

Radio access between the NIUs and the base stations is limited by an effective cell radius that is determined based on limitations in the electronic wave environment and the transmission power. The base station controller provides for effective communication between the wireless and wired portions of the WLL system. The base station controller is located between the local switching center and the base station, for connecting the local switching center and the base station. It is also responsible for managing the base station. The base station controller is generally connected to respective base stations by wire and manages the base stations, radio resources, transcoding, and the function that determines a base station's respective switchboard match.

The base station managing device is responsible for managing and maintaining the entire equipment of the WLL system and other functions including network system management, performance management, data processing, software management, security management, and the like.

A WLL system includes a telephone set and a NIU. There are two types of WLL systems: separate and integrated. A separate WLL system has a stationary telephone set and a separate NIU that can be connected to the stationary telephone by way of a wire. The separate NIU can be purchased when a subscriber having a stationary telephone set connected to an existing wire network intends to subscribe to a WLL service. An integrated WLL system includes a telephone set and a NIU integrated into a self-contained one-piece hardware unit, intended for use by a subscriber who has no stationary telephone set connected to an existing wire network.

FIG. 1 illustrates a block diagram of a WLL system. As shown, the WLL system is provided with a RF transmission/reception mechanism 11. The RF transmission/reception mechanism 11 receives a RF signal provided by an antenna. The antenna has a transmission frequency range of 824–849 MHz and a reception frequency range of 869–894 MHz provided by a super heterodyne system. After receiving an RF signal from the antenna, the RF transmission/reception mechanism 11 produces an IF (Intermediate Frequency) signal and converts the IF signal into a digital baseband signal through an amplifier and an analog/digital converter. The digital baseband signal is then provided to an MSM 12 (Mobile System Modem).

The RF transmission/reception mechanism 11 also operates to receive a digital baseband signal provided by the MSM 12 and to convert the digital baseband signal into an analog signal producing an intermediate frequency signal. The RF transmission/reception mechanism 11 converts the IF signal into a RF band signal for transmission. The RF band signal is provided to the base station through the antenna.

The MSM 12 decodes a digital baseband signal provided by the RF transmission/reception mechanism 11 to produce information data. The information data is then coded and converted into a digital baseband signal and is thereafter provided to the RF transmission/reception mechanism 11. A CODEC 13 codes an analog voice signal provided by a microphone in the handset into a digital voice signal. The digital voice signal is then provided to the MSM 12. The digital voice signal is decoded by the MSM 12 into an analog voice signal.

Levels of respective voice signals are adjusted and provided to a speaker in a handset 14. The handset 14 is connected to the CODEC 13 by a coil line having a speaker for presenting the analog voice signal provided by the CODEC 13 and a microphone for providing an analog voice signal to the CODEC 13 and a RS-232C driver 15 for line connection between an external device (e.g., a computer) and the WLL system for carrying out serial communication.

The modes of operation of the WLL system of FIG. 1 are provided below. First, the reception mode is explained and thereafter the transmission mode. A hook detecting mechanism (not shown) detects the on/off status of the hook switch and provides the status information of the hook switch to the MSM 12. The MSM 12 always determines the on/off status of the hook switch. Accordingly, when an antenna signal is received from the base station in a state when the hook switch is off (i.e., the handset is on the hook), a ring signal is provided to a user. The RF transmission/reception mechanism 11 receives the RF signal from the antenna, produces an intermediate frequency IF signal, converts the IF signal into digital baseband signal, and provides the digital baseband signal to the MSM 12.

The MSM 12 decodes the digital baseband signal provided by the RF transmission/reception mechanism 11 to produce information data. The MSM 12 then provides the information data to the CODEC 13. The CODEC 13 decodes the digital voice signal provided by the MSM 12 into an analog voice signal, adjusts levels of respective voice signals, and presents a voice signal through the speaker in the handset 14.

In transmission mode, an analog voice signal received through the microphone in the handset is coded at the CODEC 13 into a digital voice signal that is provided to the MSM 12. The MSM 12 receives the digital voice signal, converts the coded digital voice signal into a digital baseband signal, and provides the digital baseband signal to the RF transmission/reception mechanism 11. The RF transmission/reception mechanism 11 receives the digital baseband signal provided by the MSM, converts the digital baseband signal into an analog IF signal, and converts the IF signal into a RF baseband signal intended to for transmission. The RF band signal is then provided to the base station through the antenna. In this manner, the WLL system completes transmission to the base station.

When a user tries to make a phone call, the user picks up the handset 14. Picking up the handset 14 turns on the hook switch. The user then dials a telephone number on a key pad (not shown) causing a radio channel for communication to be assigned to the WLL system in the manner explained above. The WLL system may be connected to a personal computer through the RS-232C driver 15 for digital data transmission/reception.

Unfortunately, the WLL system discussed above is incapable of interfacing with analog communication devices, such as a credit card referencing device, a smart pay-phone, a security system, a wireless inspection device, or a computer with a built in MODEM. Thus, an improved WLL system is needed that allows regular data transmission/reception to/from said analog communication devices.

SUMMARY

The present invention is directed to a wireless local loop system capable of interfacing with an analog communication device.

The features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with one embodiment, the wireless local loop system of the invention comprises: a MODEM for converting between analog and digital data; a MSM for providing an interface between an antenna and the MODEM; and a SLIC (SLT interface Circuit) for providing an interface between one or more analog communication devices and the MODEM, wherein the SLIC matches analog data line characteristics of at least a telephone or the one or more analog communication devices; wherein the MODEM at least (1) receives an analog data signal provided by the one or more analog communication devices via the SLIC, converts the analog data signal into a class '0' digital data, and provides the class '0' digital data to the MSM, or (2) receives a class '0' digital data provided by the MSM, converts the class '0' digital data into an analog data signal, and provides the analog data signal to the analog communication device through the SLIC; and further wherein the MSM at least (1) codes the digital data provided by the MODEM, converts the coded digital data into a digital baseband signal, and provides the digital baseband signal through the antenna for transmission, or (2) decodes a digital baseband signal received through the antenna to produce information data, and provides the information data to the MODEM.

In one embodiment, the wireless local loop system further includes a telephone set, and a CODEC for at least (1) receiving an analog voice signal from the telephone set via the SLIC, coding the analog voice signal into a digital voice data, and providing the digital voice data to the MSM, or (2) converting a digital voice data provided by the MSM into an analog voice signal, and providing the analog voice signal to the telephone set via the SLIC.

The MODEM, in accordance with one embodiment, comprises: a data modem for at least (1) converting the analog signal provided by the one or more analog communication devices into a class '0' digital data, or (2) converting a class '0' digital data provided by the MSM into an analog signal, and for further providing the analog signal to the SLIC. The MODEM may also include memory for temporarily storing data wherein the data comprises at least: (1) the class '0' digital data converted at the data modem, or (2) the class '0' digital data provided by the MSM. In some embodiments, the MODEM also includes a controller for at least (1) controlling or converting the data to be in conformity with protocol characteristics of the one or more analog communication devices, (2) controlling signal processing at the data modem, and (3) reading/writing the data in memory, for providing/receiving a signal to/from the MSM or the SLIC.

In one embodiment, the controller controls or converts data to be in conformity with protocol characteristics of the analog communication device, and provides a control signal to the system including the base station to provide interchangeability between the analog communication device and other system components.

In one embodiment, the MODEM further includes a DTMF detecting mechanism for detecting a DTMF signal provided by the analog data of the MODEM and for providing the DTMF signal to the controller so that the controller can determine whether the data is a voice signal or a data signal.

The analog communication device in accordance with one or more embodiments of the invention can be a credit card referencing device, a smart pay-phone, a telephone, a security system, a wireless inspection device, or the like.

It is to be understood that both the foregoing general description and the following detailed description are exemplary and explanatory and are intended to provide further explanation of the invention as claimed. Other aspects and advantages of the invention will be more fully understood from the following descriptions and accompanying drawings.

BRIEF DESCRIPTION OF THE DRAWINGS

The accompanying drawings, which are included to provide a further understanding of the invention, are incorporated in and constitute a part of this specification.

FIG. 1 illustrates a block diagram of a related art WLL system;

FIG. 2 illustrates a block diagram of a WLL system capable of interfacing with an analog communication device in accordance with a preferred embodiment of the present invention; and FIG. 3 illustrates a detailed block diagram of the MODEM in FIG. 2.

DETAILED DESCRIPTION OF THE PREFERRED EMBODIMENT

Reference will now be made in detail to one or more embodiments of the present invention, examples of which are illustrated in the accompanying drawings.

Figure 1:
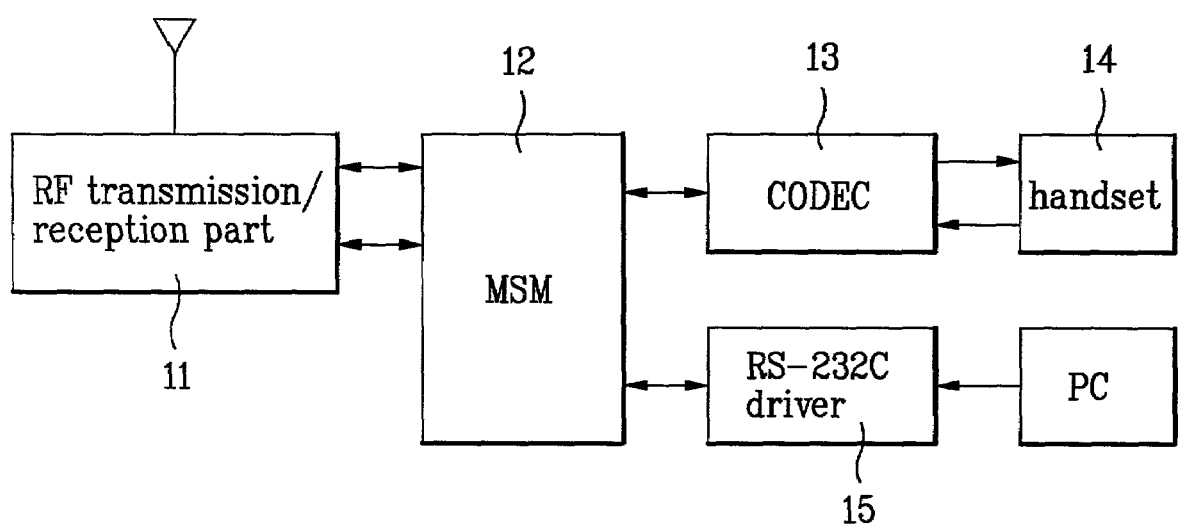
FIGS. 1 through 3 illustrate various embodiments of the invention and together with the description serve to explain the principles of the invention. Features, elements, and aspects of the invention that are referenced by the same numerals in different figures represent the same, equivalent, or similar features, elements, or aspects in accordance with one or more embodiments of the system.
Figure 2:
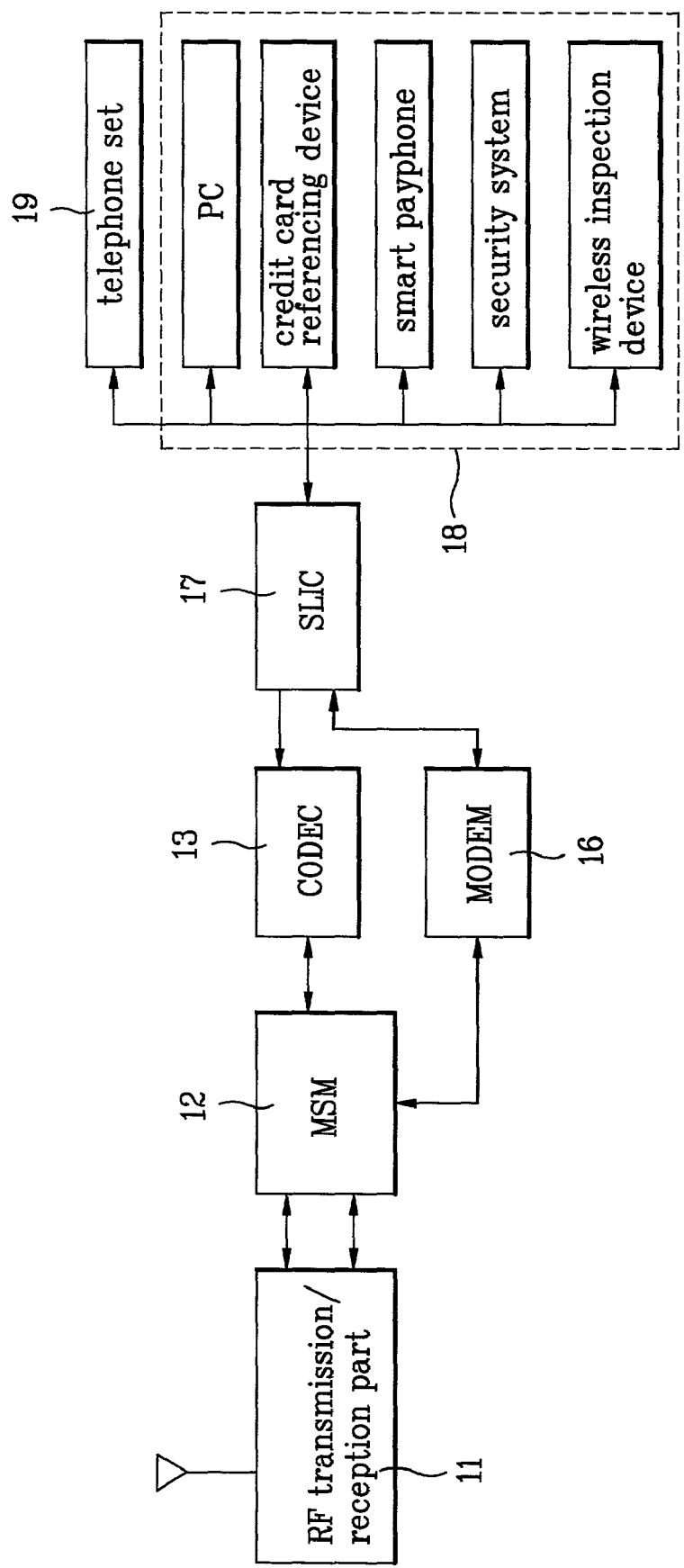

FIG. 2 illustrates a block diagram of a WLL system capable of interfacing with at least one analog communication device in accordance with an embodiment of the present invention. Referring to FIG. 2, an embodiment of the WLL system capable of interfacing with an analog communication device comprises: one or more analog communication devices 18 and/or a telephone set 19, a SLIC (SLT interface Circuit) 17, a CODEC 13, a MODEM 16, an MSM 12, and a RF transmission/reception mechanism.

The one or more analog communication devices 18 may be one of the following devices or an equivalent thereof: a credit card referencing device, a smart pay-phone, a security system, a wireless inspection device, a PC (personal computer) or any other computing or electronic communication device.

The SLIC 17 is provided for matching analog data lines of one or more of the analog communication devices 18 or the telephone set 19 to provide an interface between said devices and the WLL system of the invention.

The CODEC 13 is provided for: receiving an analog voice signal from the telephone set 19 through the SLIC 17, coding the analog voice signal into a digital voice data, and providing the digital voice data to an MSM 12. CODEC 13 is also provided for: decoding a digital voice data provided by the MSM 12 to an analog voice signal, and providing the analog voice signal to the telephone set 19 through the SLIC 17.

The MODEM 16 is provided for: receiving the analog data signal provided by the analog communication device 18 through the SLIC 17, converting the analog data signal into a class '0' digital data, and providing the class '0' digital data to the MSM 12. MODEM 16 is also provided for: receiving a class '0' digital data provided by the MSM 12, converting the class '0' digital data into an analog data signal, and providing the analog data signal to the analog communication device 18 through the SLIC 17.

The MSM 12 is provided for coding the digital data provided by the CODEC 13 or the MODEM 16, converting the coded digital data into a digital baseband signal, and providing the digital baseband signal to a RF transmission/reception mechanism 11. The MSM 12 is also provided for decoding a digital baseband signal provided by the RF transmission/reception mechanism 11 (i.e., to produce information data), coding the information data, and providing the information data to the CODEC 13 or the MODEM 16.

The RF transmission/reception mechanism 11 is provided for: converting a digital baseband signal provided by the MSM 12 into an analog IF (Intermediate Frequency) signal, and converting the IF signal into a RF baseband signal intended for transmission to the base station through the antenna. The RF transmission/reception mechanism 11 is also provided for: receiving a RF signal through the antenna, producing an IF signal, converting the IF signal into a digital baseband signal, and providing the digital baseband signal to the MSM 12.

Figure 3:
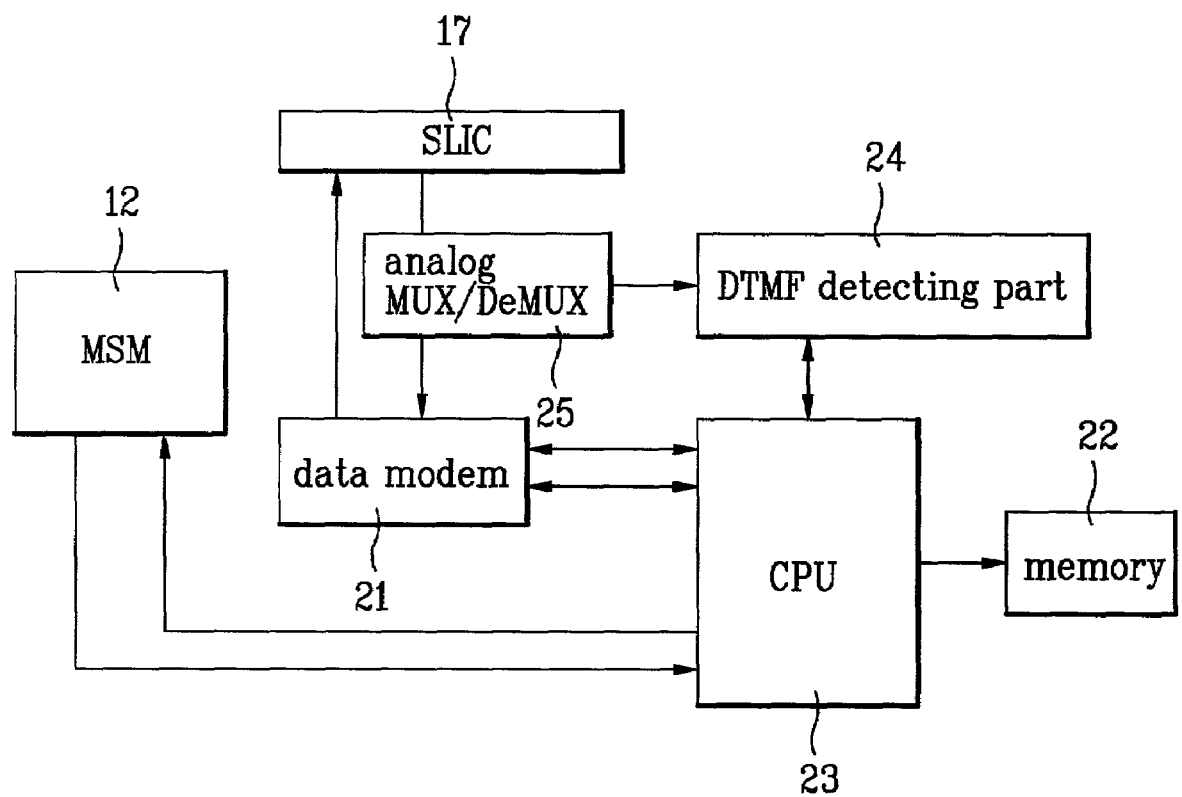

The operation of MODEM 16 is discussed in further detail below. Referring to FIG. 3, a detailed block diagram of the MODEM 16 of FIG. 2 is illustrates. In one embodiment, the MODEM 16 comprises: a data modem 21, memory 22, a controller (CPU) 23, a DTMF detecting mechanism 24, and an analog MUX/DeMUX 25.

The data modem 21 is provided for converting an analog signal provided by the analog communication device 18 through the SLIC 17 into a class '0' digital data. Alternatively, the data modem 21 may be used to convert a class '0' digital data provided by the MSM 12 into an analog signal.

The memory 22 is provided to temporarily store the class '0' digital data converted by the data modem 21, or to temporarily store the class '0' digital data provided by the MSM 12. In one or more embodiments of the invention, the class '0' digital data can be any kind of data including fax data.

The controller (CPU) 23 is provided for: controlling or converting data for conformity with protocol characteristics of the analog communication devices 18, in accordance with the type of the respective analog communication device 18 interfacing with the system. The controller 23 is also provided for reading or writing data from or to the memory 22, and controlling signal processing at the data modem 21 for providing or receiving signals to or from the MSM 12 and the SLIC 17, and also for providing a control signal to a base station. Controller 23 also allows for interchangeability between the analog communication device 18 and a modem, so that the modem can exchange signals with the analog communication device 18, where the analog communication device 18 is a credit card referencing device or a smart pay-phone.

The DTMF detecting mechanism 24 is provided for detecting a DTMF signal and providing the DTMF signal to the controller 23, so that the controller 23 can determine whether the data is a voice signal or a data signal. As shown, the DTMF detecting mechanism interfaces with the SLIC 17 through an analog MUX/DeMUX 25.

In one or more embodiments, the WLL system of the invention may interface with a telephone set 19 in a well-known manner, such as that discussed in the background section of this application. Below, we discuss the operation of the WLL system of the present invention in association with exemplary analog communication devices 18, such as a credit card referencing device and a smart phone. This discussion is by way of example, however, and should not be construed to limit the use of the WLL system of the invention only to such devices. The WLL system of this invention may be used, in accordance with other embodiments, in association with any other analog communication device 18 or equivalents thereof. In one or more embodiments, the analog communication devices 18 discussed herein include an analog MODEM.

In one or more embodiments of the invention, a credit card referencing device can be used to communicate through the MODEM 16 with a designated telephone (e.g., a telephone that has the phone number to a credit card company or an entity similar thereto) to reference information about available credit of a card holder. Or, for example, a smart pay-phone may be used to transmit data to a designated switchboard through the MODEM 16 to report the present state of the smart pay-phone to an appropriate entity. Other analog communication devices may also communicate with a designated telephone having numbers to places related to reporting their present states. Accordingly, when the analog communication device 18 provides an analog signal to the WLL system, the SLIC 17 transfers the received signal to the MODEM 16.

The operation of the MODEM 16 is discussed below, in accordance with one or more embodiments of the invention. The DTMF detecting mechanism 24 detects a DTMF signal as provided by the SLIC 17 and thereby informs the controller 23 of the DTMF signal. The controller 23 determines whether the received signal is a voice signal or a data signal. When the DTMF detecting mechanism 24 detects the DTMF signal, the controller 23 recognizes the input of the analog communication device 18 as a designated telephone number, for example, and arranges to setup a call in accordance with the provided telephone number.

When the DTMF signal is the same as a particular signal stored in the controller 23, the controller 23 recognizes that the received signal is a data call and then controls the data modem 21 to convert an analog signal provided by the SLIC 17 into a class '0' digital data in conformity with protocol characteristics of the analog communication device 18 and acts to temporarily store the converted data in the memory 22.

Where the analog communication device 18 is a credit card referencing device or a smart pay-phone, for example, the controller 23 provides the data stored in the memory 22 to the MSM 12 together with a control signal to be transmitted to a system that includes a base station. As such, signal and data interchangeability is provided between the analog communication device 18, the MODEM 16 and the other components of the WLL system.

MSM 12 codes the class '0' digital data received from the controller 23, converts the class '0' digital data into a digital baseband signal, and provides the digital baseband signal to the RF transmission/reception mechanism 11. The RF transmission/reception mechanism 11 converts the digital baseband signal received from the MSM into an analog signal, an intermediate frequency signal, and a RF band signal, and provides the RF band signal to a base station through the antenna.

When the WLL system of the invention is receiving information, the hook detecting mechanism (not shown) detects the off/on status of the hook switch and provides the status information of the hook switch to the MSM 12. The MSM 12 is responsible for verifying the off/on status of the hook switch. Accordingly, when a signal is received at the antenna from a base station in a state when the hook switch is switch off, a ring signal is provided to inform the user of an incoming call. Then, the RF transmission/reception mechanism 11 receives the RF signal from the antenna, produces the IF signal, converts the IF signal into a digital baseband signal, and provides the digital baseband signal to the MSM 12.

The MSM 12 decodes the digital baseband signal, received from the RF transmission/reception mechanism 11, to produce information data. The MSM 12 provides the information data (i.e., class '0' digital data) to the MODEM 16. The MODEM 16 decodes the class '0' digital data provided by the MSM 12 into an analog signal and provides the analog signal to the analog communication device 18 through the SLIC 17. Then, the analog communication device 18 displays the analog signal provided through the SLIC 17 on a display mechanism for the user's viewing.

As such, the WLL system of the invention is capable of interfacing with an analog communication device and provides the following advantages: First, since the WLL system of the invention is capable of interfacing with an analog communication device, wireless communication with an analog communication device through the wireless local loop system is made possible. Second, since wireless communication with an analog communication device through the wireless local loop system is possible, the analog communication device can be easily used to make a call even in a region where a wired communication network is weak or unavailable.

Although particular embodiments of the invention have been shown and described, it will be obvious to those skilled in the art that changes and modifications may be made without departing from the invention in its broader aspects, and therefore, the appended claims are to encompass within their scope all such changes and modifications that fall within the true scope of the invention.

What is claimed is:

1. A wireless local loop system for interfacing with one or more analog communication devices, the wireless local loop system comprising:
    a MODEM for converting between analog and digital data, the MODEM comprising:
        a data modem for at least (1) converting the analog signal provided by the one or more analog communication devices via a SLIC (SLT interface Circuit) into a class '0' digital data, or (2) converting a class '0' digital data provided by a mobile station modem (MSM) into an analog signal, and providing the analog signal to the SLIC;
        a memory for temporarily storing data wherein the data comprises at least (1) the class '0' digital data converted by the data modem, or (2) the class '0' digital data provided by the MSM;
        a controller in communication with the MSM and the SLIC for at least (1) converting the data to be in conformity with protocol characteristics of the one or more analog communication devices, (2) controlling signal processing at the data modem, and (3) reading/writing data from/to memory;
    the MSM providing an interface between an antenna and the MODEM; and
    the SLIC providing an interface between one or more analog communication devices and the MODEM, wherein the SLIC matches analog data line characteristics of at least a telephone or that of the one or more analog communication devices,
    wherein the MODEM operates to at least (1) receive an analog data signal provided by the one or more analog communication devices via the SLIC, convert the analog data signal into a class '0' digital data, and provide the class '0' digital data to the MSM, or (2) receive a class '0' digital data provided by the MSM, convert the class '0' digital data into an analog data signal, and provide the analog data signal to the analog communication device through the SLIC, and
    wherein the MSM operates to at least (1) code digital data provided by the MODEM, convert the coded digital data into a digital baseband signal, and provide the digital baseband signal to an antenna, or (2) decode a digital baseband signal received through the antenna to produce information data, and provide the information data to the MODEM.

2. A wireless local loop system as claimed in claim 1, further comprising:
    a telephone set; and a CODEC for at least (1) receiving an analog voice signal provided by the telephone set via the SLIC, coding the analog voice signal into digital voice data, and providing the digital voice data to the MSM, or (2) converting digital voice data provided by the MSM into an analog voice signal, and providing the analog voice signal to the telephone set via the SLIC.

3. A wireless local loop system as claimed in claim 1, wherein the controller controls or converts the data to be in conformity with protocol characteristics of the one or more analog communication devices, and provides a control signal to a base station for providing signal and data interchangeability between the analog communication device and the MODEM.

4. A wireless local loop system as claimed in claim 1, further comprising a DTMF detecting mechanism for detecting a DTMF signal in the analog data provided by the MODEM and providing the DTMF signal to the controller so that the controller can determine whether the data is a voice signal or a data signal and an analog MUX/DeMUX through which the DTMF detecting mechanism interfaces with the SLIC.

5. A wireless local loop system as claimed in claim 1, wherein at least one of the one or more analog communication devices is a credit card referencing device.

6. A wireless local loop system as claimed in claim 1, wherein at least one of the one or more analog communication devices is a smart pay-phone.

7. A wireless local loop system as claimed in claim 1, wherein at least one of the one or more analog communication devices is a telephone.

8. A wireless local loop system as claimed in claim 1, wherein at least one of the one or more analog communication devices is a security system.

9. A wireless local loop system as claimed in claim 1, wherein at least one of the one or more analog communication devices is a wireless inspection device.

10. A method for providing an interface between a wireless local loop system and one or more analog communication devices, the method comprising:
  providing an interface between an antenna and a MODEM, by way of a mobile station modem (MSM), wherein the MODEM is used for converting between analog and digital data by way of:
  converting the analog signal provided by the one or more analog communication devices via a SLIC (SLT interface Circuit) into a class '0' digital data, by way of a data modem;
  converting a class '0' digital data provided by a mobile station modem (MSM) into an analog signal;
  providing the analog signal to the SLIC;
  temporarily storing data in a memory, wherein the data comprises at least one of (1) the class '0' digital data converted by the data modem, and (2) the class '0' digital data provided by the MSM; and
  using a controller in communication with the MSM and the SLIC to do at least one of the following: (1) converting the data to be in conformity with protocol characteristics of the one or more analog communication devices, (2) controlling signal processing at the data modem, and (3) reading/writing data from/to memory;
  providing an interface between one or more analog communication devices and the MODEM, by way of the SLIC providing, wherein the SLIC matches analog data line characteristics of at least a telephone or that the one or more analog communication devices;
  wherein the MODEM operates to at least (1) receive an analog signal provided by the one or more analog communication devices via the SLIC, convert the analog data signal into a class '0' digital data, and provide the class '0' digital data to the MSM, or (2) receive a class '0' digital data provided by the MSM, convert the class '0' digital data into an analog data signal, and provide the analog data signal to the analog communication device through the SLIC, and
  wherein the MSM operates to at least (1) code digital data provided by the MODEM, convert the coded digital data into a digital baseband signal, and provide the digital baseband signal to an antenna, or (2) decode a digital baseband signal received through the antenna to produce information data, and provide the information data to the MODEM;
  detecting a DTMF signal in the analog data provided by the MODEM by way of a DTMF detecting mechanism; and
  providing the DTMF signal to the controller so that the controller can determine whether the data is a voice signal or a data signal,
  wherein an analog MUX/DeMUX is provided through which the DTMF detecting mechanism interfaces with the SLIC.

11. The method of claim 10, wherein:
  a telephone set and a CODEC are provided for at least (1) receiving an analog voice signal provided by the telephone set via the SLIC, coding the analog voice signal into digital voice data, and providing the digital voice data to the MSM, or (2) converting digital voice data provided by the MSM into an analog voice signal, and providing the analog voice signal to the telephone set via the SLIC.

12. The method of claim 11, wherein the controller controls or converts the data to be in conformity with protocol characteristics of the one or more analog communication devices, and provides a control signal to a base station for providing signal and data interchangeability between the analog communication device and the MODEM.

13. The method of claim 10, wherein at least one of the one or more analog communication devices is a credit card referencing device.

14. The method of claim 10, wherein at least one of the one or more analog communication devices is a smart pay-phone.

15. The method of claim 10, wherein at least one of the one or more analog communication devices is a telephone.

16. The method of claim 10, wherein at least one of the one or more analog communication devices is a security system.

17. The method of claim 10, wherein at least one of the one or more analog communication devices is a wireless inspection device.

* * * * *